United States Patent
Desserrey et al.

(10) Patent No.: US 12,143,351 B2
(45) Date of Patent: Nov. 12, 2024

(54) UNIFIED CONTENT FEED

(71) Applicant: Snap Inc., Santa Monica, CA (US)

(72) Inventors: Laurent Desserrey, Los Angeles, CA (US); Imani Ritchards, Los Angeles, CA (US); Ian Anthony Wehrman, Venice, CA (US); Yuriana Zamora, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/471,157

(22) Filed: Sep. 20, 2023

(65) Prior Publication Data
US 2024/0348569 A1    Oct. 17, 2024

Related U.S. Application Data

(60) Provisional application No. 63/496,208, filed on Apr. 14, 2023.

(51) Int. Cl.
*H04L 51/216* (2022.01)
*H04L 51/046* (2022.01)
*H04L 51/56* (2022.01)
*H04L 51/52* (2022.01)

(52) U.S. Cl.
CPC .......... *H04L 51/216* (2022.05); *H04L 51/046* (2013.01); *H04L 51/56* (2022.05); *H04L 51/52* (2022.05)

(58) Field of Classification Search
CPC ... H04L 51/42; H04L 51/046; H04L 12/1813; H04L 51/216; H04L 51/56; H04L 51/52; G06F 3/04842
See application file for complete search history.

(56) References Cited

U.S. PATENT DOCUMENTS 6,804,675 B1 * 10/2004 Knight ................ G06Q 10/107
                                                   707/999.102
9,583,142 B1    2/2017 Zhu et al.
9,733,794 B1    8/2017 Hughes et al.
(Continued)

FOREIGN PATENT DOCUMENTS

WO    WO-2014079534 A1 *  5/2014   ....... G06F 17/30867

OTHER PUBLICATIONS

"U.S. Appl. No. 18/099,695, Non Final Office Action mailed Sep. 16, 2024", 12 pgs.
(Continued)

*Primary Examiner* — Oanh Duong
(74) *Attorney, Agent, or Firm* — SCHWEGMAN LUNDBERG & WOESSNER, P.A.

(57) ABSTRACT

Systems and methods herein describe generating a unified content feed accessible from within a conversation thread. The systems and methods access a chat session between a first user and a second user, access user data, activity data and personalized media content associated with each user, the media personalized content comprising public media content that is related to each user's user data and activity data, generates a shared dataset based on identifying common aspects between each user's user data and activity data, generates shared content comprising public media content that is related to shared dataset, and causes display of a unified content feed comprising the shared content and personalized content to each user's computer device.

20 Claims, 8 Drawing Sheets

(56) References Cited

U.S. PATENT DOCUMENTS

| | | | |
|---|---|---|---|
| 2011/0161449 A1* | 6/2011 | Callanan | H04L 51/046 709/206 |
| 2012/0259927 A1 | 10/2012 | Lockhart | |
| 2015/0006544 A1* | 1/2015 | Isquith | G06F 16/435 707/748 |
| 2015/0149600 A1* | 5/2015 | Thibeault | H04L 67/1097 709/219 |
| 2016/0189198 A1* | 6/2016 | McKenzie | G06Q 30/0277 705/14.41 |
| 2016/0300265 A1 | 10/2016 | Goyal et al. | |
| 2018/0232121 A1 | 8/2018 | Lewis et al. | |
| 2021/0201349 A1* | 7/2021 | Singh | G06N 20/00 |
| 2021/0266275 A1* | 8/2021 | Kim | H04N 7/15 |

OTHER PUBLICATIONS

"International Application Serial No. PCT/US2024/023430, International Search Report mailed Jul. 22, 2024", 3 pgs.

"International Application Serial No. PCT/US2024/023430, Written Opinion mailed Jul. 22, 2024", 7 pgs.

"International Application Serial No. PCT/US2024/023735, International Search Report mailed Aug. 13, 2024", 3 pgs.

"International Application Serial No. PCT/US2024/023735, Written Opinion mailed Aug. 13, 2024", 8 pgs.

* cited by examiner

UNIFIED CONTENT FEED

CLAIM OF PRIORITY

This application claims the benefit of priority to U.S. Provisional Application Ser. No. 63/496,208, filed on Apr. 14, 2023, which is incorporated herein by reference in its entirety.

TECHNICAL FIELD

Embodiments herein generally related to public media content. More specifically, but not by way of limitation, embodiments herein describe a generating a unified content feed with public media content for members of conversation thread.

BACKGROUND

Users of messaging applications share media content such as images and videos among different conversation threads involving groups of friends. Each conversation thread may be tailored towards particular interests, hobbies and conversation topics.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The following paragraphs describe systems and methods for generating a shared content feed for users in a conversation thread. A conversation thread may be launched from an interface of a messaging system. The conversation thread is between users of a social media application who are "connected" to one another. A content feed can be accessed by each member in a group conversation thread from within the conversation thread. For example, an icon or button is visible within the conversation thread, and upon selection of the icon or button, a content feed is launched in the social media application. The content feed includes public media content (e.g., videos and images). The content feed includes shared content which has public media content that is relevant to all members in the group conversation thread and personalized content, that is personalized to each member in the group. The shared content is only visible if the content feed is accessed from within the conversation thread. The content feed can also be accessed from outside the conversation thread and from other entry points in the social media application. When the content feed is accessed outside the conversation thread, the content feed only includes a personalized content feed for a specific user of the social media application.

The shared content is determined by analyzing an overlap in group members' profile data and interests. For example, shared content can be selected based on an overlap in demographic data, location data, or friendship or connection data within the social media application. The shared content can also be selected based on an overlap in public media content category interests, subscriptions to content creators of the public media content, and other activity data that can be retrieved from a given users' interactions with their personalized content feed.

If the content feed is accessed from within the conversation thread, the shared content is ranked higher than the personalized content. A higher ranking of the shared content can result in displaying the content before the personalized content, more prominently displaying the shared content within the user interface, or any reasonable combination thereof. A member in a group conversation thread who interacts with content in the shared content feed can cause the specific content to be ranked higher within the shared content feed for other members of the group conversation thread.

Further details regarding generating the shared content feed are described in the paragraphs below.

Networked Computing Environment

Figure 1:
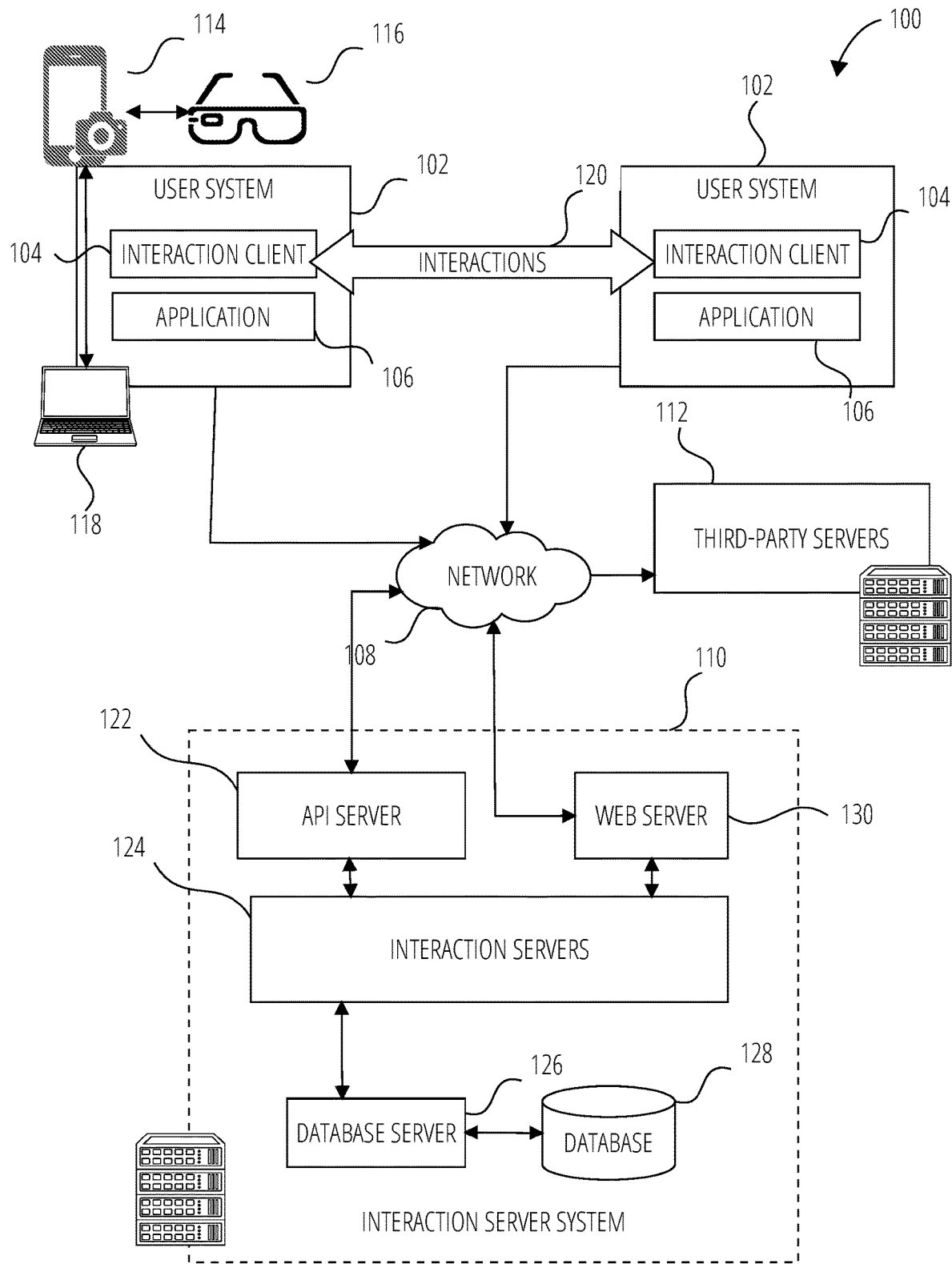
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
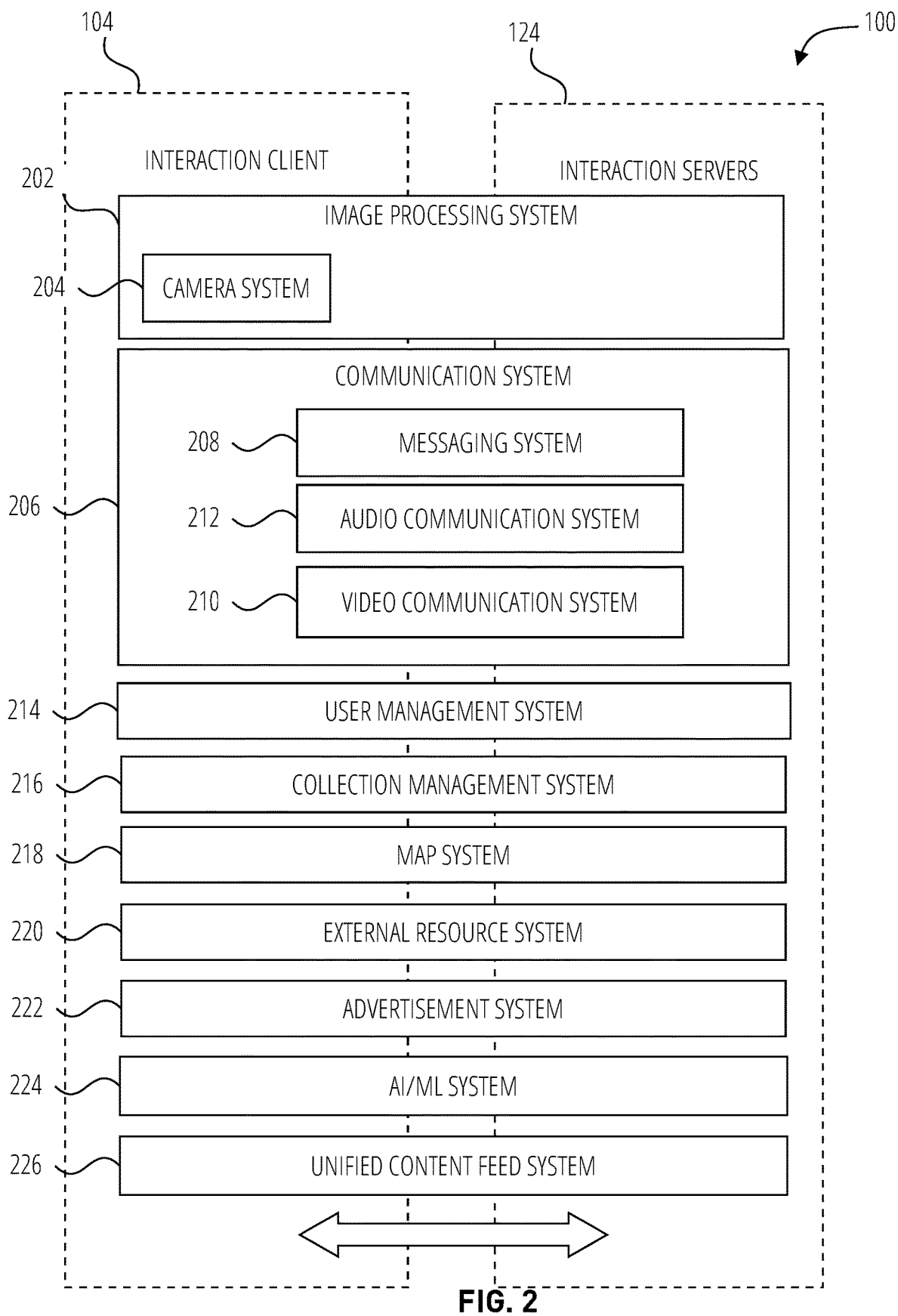
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

A communication system 206 is responsible for enabling and processing multiple forms of communication and interaction within the interaction system 100 and includes a messaging system 208, an audio communication system 212, and a video communication system 210. The messaging system 208 is responsible for enforcing the temporary or time-limited access to content by the interaction clients 104.

The messaging system 208 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 212 enables and supports audio communications (e.g., real-time audio chat) between multiple interaction clients 104. Similarly, the video communication system 210 enables and supports video communications (e.g., real-time video chat) between multiple interaction clients 104.

A user management system 214 is operationally responsible for the management of user data and profiles, and maintains entity information (e.g., stored in entity tables 308, entity graphs 310 and profile data 302) regarding users and relationships between users of the interaction system 100.

A collection management system 216 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 216 may also be responsible for publishing an icon that provides notification of a particular collection to the user interface of the interaction client 104. The collection management system 216 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 216 employs machine vision (or image recognition technology) and content rules to curate a content collection automatically. In certain examples, compensation may be paid to a user to include user-generated content into a collection. In such cases, the collection management system 216 operates to automatically make payments to such users to use their content.

A map system 218 provides various geographic location (e.g., geolocation) functions and supports the presentation of map-based media content and messages by the interaction client 104. For example, the map system 218 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

An external resource system 220 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource.

In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 222 operationally enables the purchasing of advertisements by third parties for presentation to end-users via the interaction clients 104 and also handles the delivery and presentation of these advertisements.

An artificial intelligence and machine learning system 224 provides a variety of services to different subsystems within the interaction system 100. The communication system 206 and messaging system 208 may use the artificial intelligence and machine learning system 224 to analyze communication patterns and provide insights into how users interact with each other and provide intelligent message classification and tagging, such as categorizing messages based on sentiment or topic. The artificial intelligence and machine learning system 224 may also provide chatbot functionality to message interactions 120 between user systems 102 and between a user system 102 and the interaction server system 110. The artificial intelligence and machine learning system 224 may also work with the audio communication system 212 to provide speech recognition and natural language processing capabilities, allowing users to interact with the interaction system 100 using voice commands.

The unified content feed system 226 generates a unified content feed for display within a conversation thread between two or more users of a social media application. The unified content feed includes public media content that has shared content that is relevant to all members of the conversation thread and personalized content that is unique to each member of the conversation thread. Further details on the unified content feed system 226 are described below in connection with FIG. 5.

Data Architecture

Figure 3:
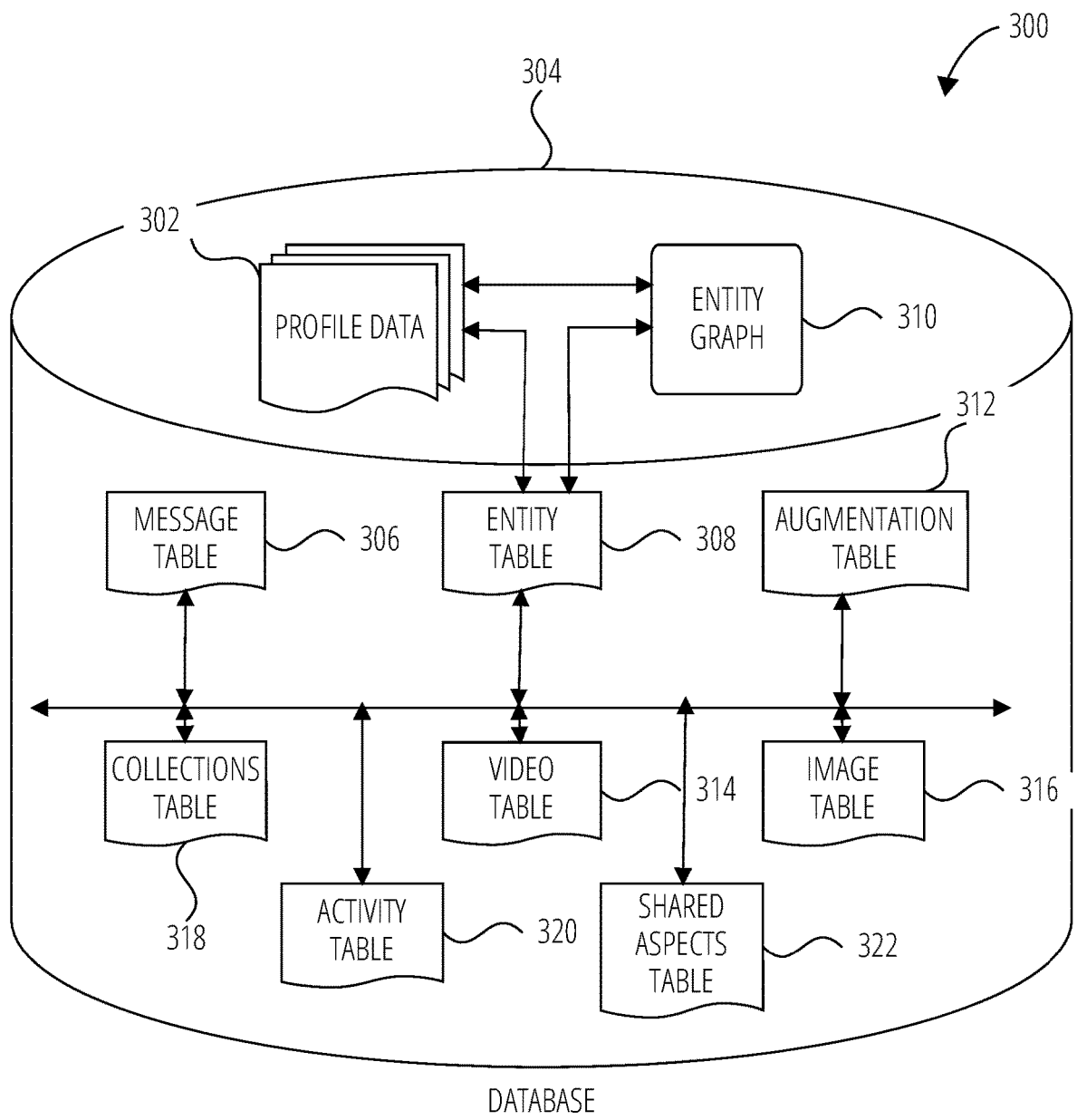
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include an activity table 320 that includes interaction information of the first user and the second user with their respective personalized feeds. The interaction information also includes previous public media content shared between the first user and the second user within their conversation thread. The shared aspects table 322 includes common aspects between the first user's data, the first user's activity data, the second user's data and the second user's activity data.

Data Communications Architecture

Figure 4:
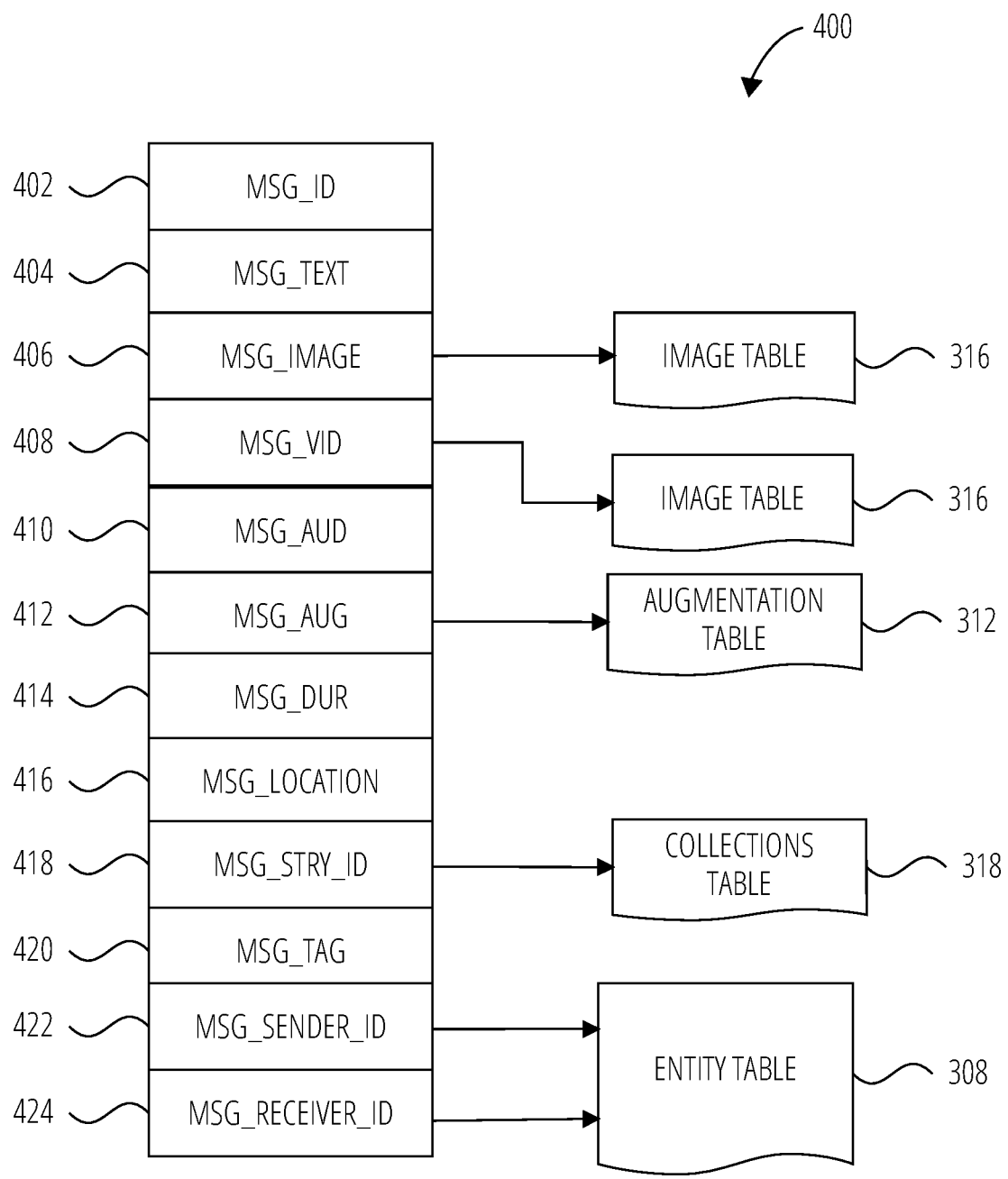
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Figure 5:
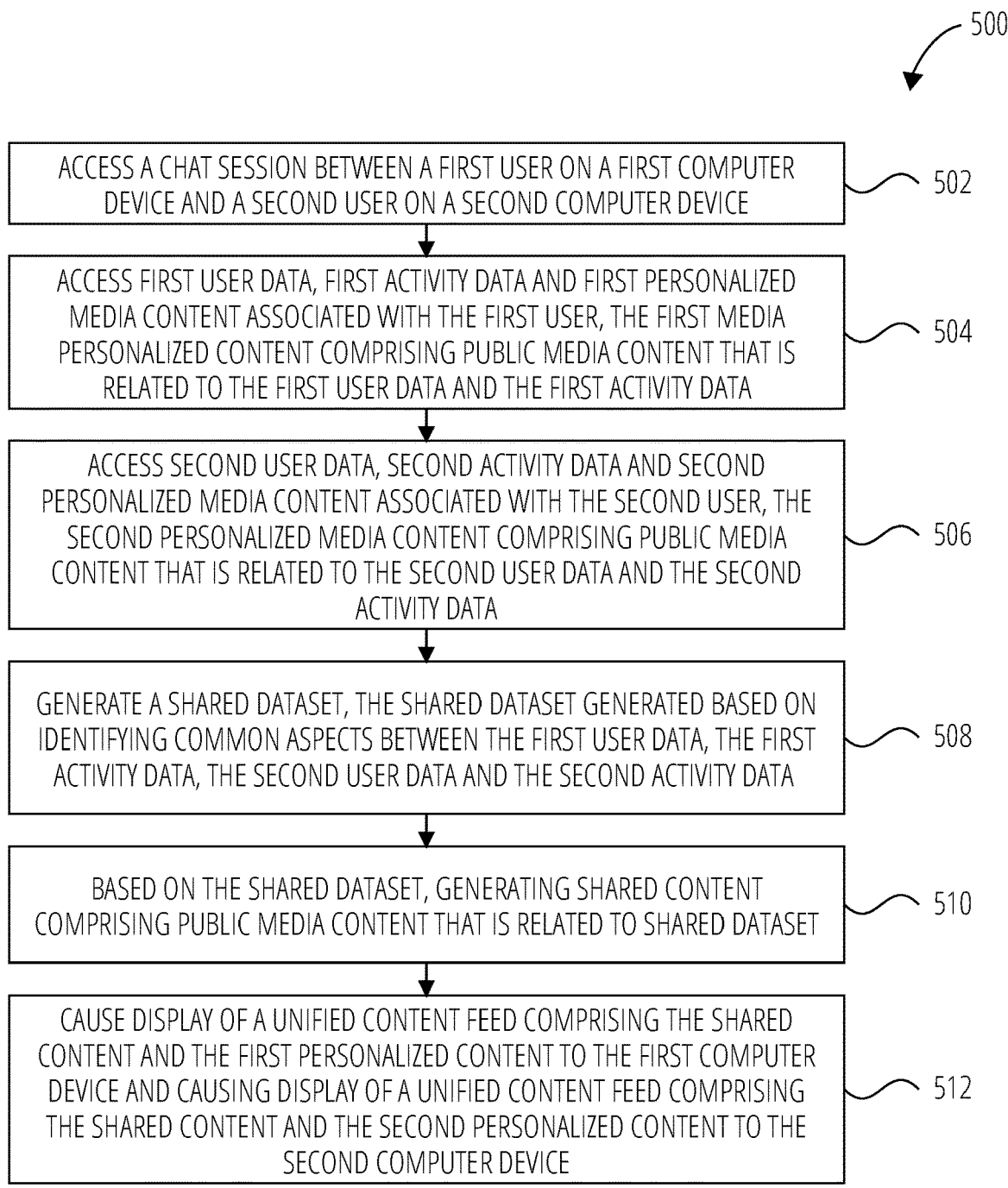
FIG. 5 illustrates a process for generating shared content to display in a content feed that is accessed from within a communication thread between at least two users of a social media platform, in accordance with one example.

FIG. 5 illustrates a process 500 for generating shared content to display in a content feed that is accessed from within a communication thread between at least two users of a social media platform, in accordance with one example. In one example, the processor in a unified content feed system 226, the processor in a communication system 206, the processor in a messaging system 208, the processor in the client systems 102, the processor in the interaction server system 110 or any combination thereof, can perform the operations in process 500.

Although the operations below are described using a first user and a second user, it is to be understood that the process 500 can be implemented in any group conversation thread, where there are at least two users each on their own unique computing device.

In operation 502, the processor accesses a chat session (e.g., conversation thread) between a first user on a first computer device and a second user on a second computer device.

In operation 504, the processor accesses first user data, first activity data and first personalized media content associated with the first user, the first personalized media content comprising public media content that is related to the first user data and the first activity data. The first user data can be accessed from a social media profile (e.g., profile data 302) associated with the first user. The profile data 302 may further include a list of content creators that the user is subscribed to and category interests associated with the public media content (e.g., sports, fashion, food bloggers, etc.). The first user data can also include information such as demographic data. The first activity data includes interaction information associated with the first personalized media content. Interaction information includes the amount of time spent viewing a public media content item that is part of the first personalized media content, user reactions to public media content items that are part of the first personalized media content (e.g., sharing the content item, "liking" or "disliking" the content item, "commenting" on the content item, "following" a creator of the content item).

In operation 506, the processor accesses second user data, second activity data and second personalized media content associated with the second user, the second personalized media content comprising public media content that is related to the second user data and the second activity data. Examples of user data and activity data are described above in connection with operation 504.

In operation 508, the processor generates a shared dataset, the shared dataset generated based on identifying common aspects between the first user data, the first activity data, the second user data and the second activity data. Common aspects may be determined by identifying an overlap in profile data 302 data, other user data and activity data. For example, if the first user is interested in recipe content and the second user is interested in restaurant review content, the processor determines that "food" is the common aspect and surfaces content relating to food for display in the shared content.

In some examples, the processor receives an indication from the first computing device of a recommended public media content from the first personalized content. The indication may be an action such as a user reaction to the video (e.g., liking or loving the video, or commenting on the video). In response to receiving the indication, the processor adds the recommended public media content for display as part of the shared content. If a content item is added to the shared content as a result of receiving the indication, the content item can be ranked higher than other content within the shared content. Therefore, the shared content that is displayed on both the first and second computing devices can be constantly updated even when users access their personalized content feed outside of the chat conversation.

In operation 510, the processor based on the shared dataset, generates shared content comprising public media content that is related to shared dataset. In some examples, the processor accesses previously shared public media content from within the conversation thread or chat session and generates the shared content based on the shared dataset and the previously shared public media content. In some examples, the processor identifies trending public media content and includes trending public media content in the shared content even if the trending public media content does not contain the determined common aspects between each user.

In operation 512, the processor causes display of a unified content feed comprising the shared content and the first personalized content to the first computer device and causes display of a unified content feed comprising the shared content and the second personalized content to the second computer device. The unified content feed is only displayed if accessed from within the chat session. For example, the first user selects a user interface element (e.g., a button) from within the chat session user interface. Upon selection of the user interface element, the processor causes display of the unified content feed on the first computer device.

In some examples, the shared content is ranked higher than the personalized content within the unified content feed. For example, the shared content can be displayed first or before the personalized content within the unified content feed. In some examples, the shared content is displayed in a prominent position within the unified content feed (e.g., centered or with boundaries or other markings that draw attention to the shared content).

System with Head-Wearable Apparatus

Figure 6:
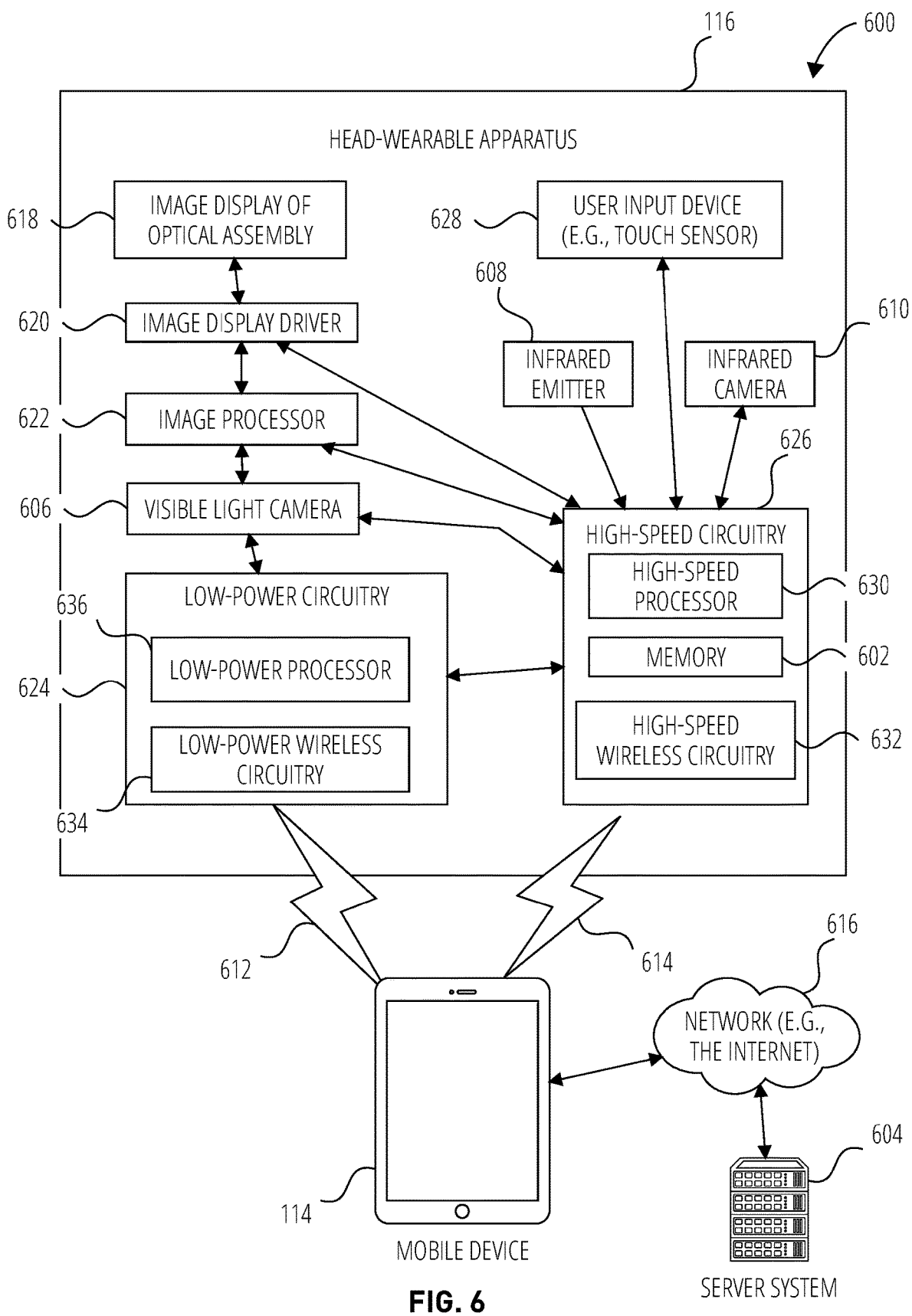
FIG. 6 illustrates a system in which the head-wearable apparatus, according to some examples.

FIG. 6 illustrates a system 600 including a head-wearable apparatus 116 with a selector input device, according to some examples. FIG. 6 is a high-level functional block diagram of an example head-wearable apparatus 116 communicatively coupled to a mobile device 114 and various server systems 604 (e.g., the interaction server system 110) via various networks 108.

The head-wearable apparatus 116 includes one or more cameras, each of which may be, for example, a visible light camera 606, an infrared emitter 608, and an infrared camera 610.

The mobile device 114 connects with head-wearable apparatus 116 using both a low-power wireless connection 612 and a high-speed wireless connection 614. The mobile device 114 is also connected to the server system 604 and the network 616.

The head-wearable apparatus 116 further includes two image displays of the image display of optical assembly 618. The two image displays of optical assembly 618 include one associated with the left lateral side and one associated with the right lateral side of the head-wearable apparatus 116. The head-wearable apparatus 116 also includes an image display driver 620, an image processor 622, low-power circuitry 624, and high-speed circuitry 626. The image display of optical assembly 618 is for presenting images and videos, including an image that can include a graphical user interface to a user of the head-wearable apparatus 116.

The image display driver 620 commands and controls the image display of optical assembly 618. The image display driver 620 may deliver image data directly to the image display of optical assembly 618 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 628 (e.g., touch sensor or push button), including an input surface on the head-wearable apparatus 116. The user input device 628 (e.g., touch sensor or push button) is to receive from the user an input selection to manipulate the graphical user interface of the presented image.

The components shown in FIG. 6 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 606 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 602, which stores instructions to perform a subset or all of the functions described herein. The memory 602 can also include storage device.

As shown in FIG. 6, the high-speed circuitry 626 includes a high-speed processor 630, a memory 602, and high-speed wireless circuitry 632. In some examples, the image display driver 620 is coupled to the high-speed circuitry 626 and operated by the high-speed processor 630 in order to drive the left and right image displays of the image display of optical assembly 618. The high-speed processor 630 may be any processor capable of managing high-speed communications and operation of any general computing system needed for the head-wearable apparatus 116. The high-speed processor 630 includes processing resources needed for managing high-speed data transfers on a high-speed wireless connection 614 to a wireless local area network (WLAN) using the high-speed wireless circuitry 632. In certain examples, the high-speed processor 630 executes an operating system such as a LINUX operating system or other such operating system of the head-wearable apparatus 116, and the operating system is stored in the memory 602 for execution. In addition to any other responsibilities, the high-speed processor 630 executing a software architecture for the head-wearable apparatus 116 is used to manage data transfers with high-speed wireless circuitry 632. In certain examples, the high-speed wireless circuitry 632 is configured to implement Institute of Electrical and Electronic Engineers (IEEE) 802.11 communication standards, also referred to herein as WI-FI®. In some examples, other high-speed communications standards may be implemented by the high-speed wireless circuitry 632.

The low-power wireless circuitry 634 and the high-speed wireless circuitry 632 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 612 and the high-speed wireless connection 614, may be implemented using details of the architecture of the head-wearable apparatus 116, as can other elements of the network 616.

The memory 602 includes any storage device capable of storing various data and applications, including, among other things, camera data generated by the left and right visible light cameras 606, the infrared camera 610, and the image processor 622, as well as images generated for display by the image display driver 620 on the image displays of the image display of optical assembly 618. While the memory 602 is shown as integrated with high-speed circuitry 626, in some examples, the memory 602 may be an independent standalone element of the head-wearable apparatus 116. In certain such examples, electrical routing lines may provide a connection through a chip that includes the high-speed processor 630 from the image processor 622 or the low-power processor 636 to the memory 602. In some examples, the high-speed processor 630 may manage addressing of the memory 602 such that the low-power processor 636 will boot the high-speed processor 630 any time that a read or write operation involving memory 602 is needed.

As shown in FIG. 6, the low-power processor 636 or high-speed processor 630 of the head-wearable apparatus 116 can be coupled to the camera (visible light camera 606, infrared emitter 608, or infrared camera 610), the image display driver 620, the user input device 628 (e.g., touch sensor or push button), and the memory 602.

The head-wearable apparatus 116 is connected to a host computer. For example, the head-wearable apparatus 116 is paired with the mobile device 114 via the high-speed wireless connection 614 or connected to the server system 604 via the network 616. The server system 604 may be one or more computing devices as part of a service or network computing system, for example, that includes a processor, a memory, and network communication interface to communicate over the network 616 with the mobile device 114 and the head-wearable apparatus 116.

The mobile device 114 includes a processor and a network communication interface coupled to the processor. The network communication interface allows for communication over the network 616, low-power wireless connection 612, or high-speed wireless connection 614. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 620. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 604, such as the user input device 628, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 612 and high-speed wireless connection 614 from the mobile device 114 via the low-power wireless circuitry 634 or high-speed wireless circuitry 632.

Machine Architecture

Figure 7:
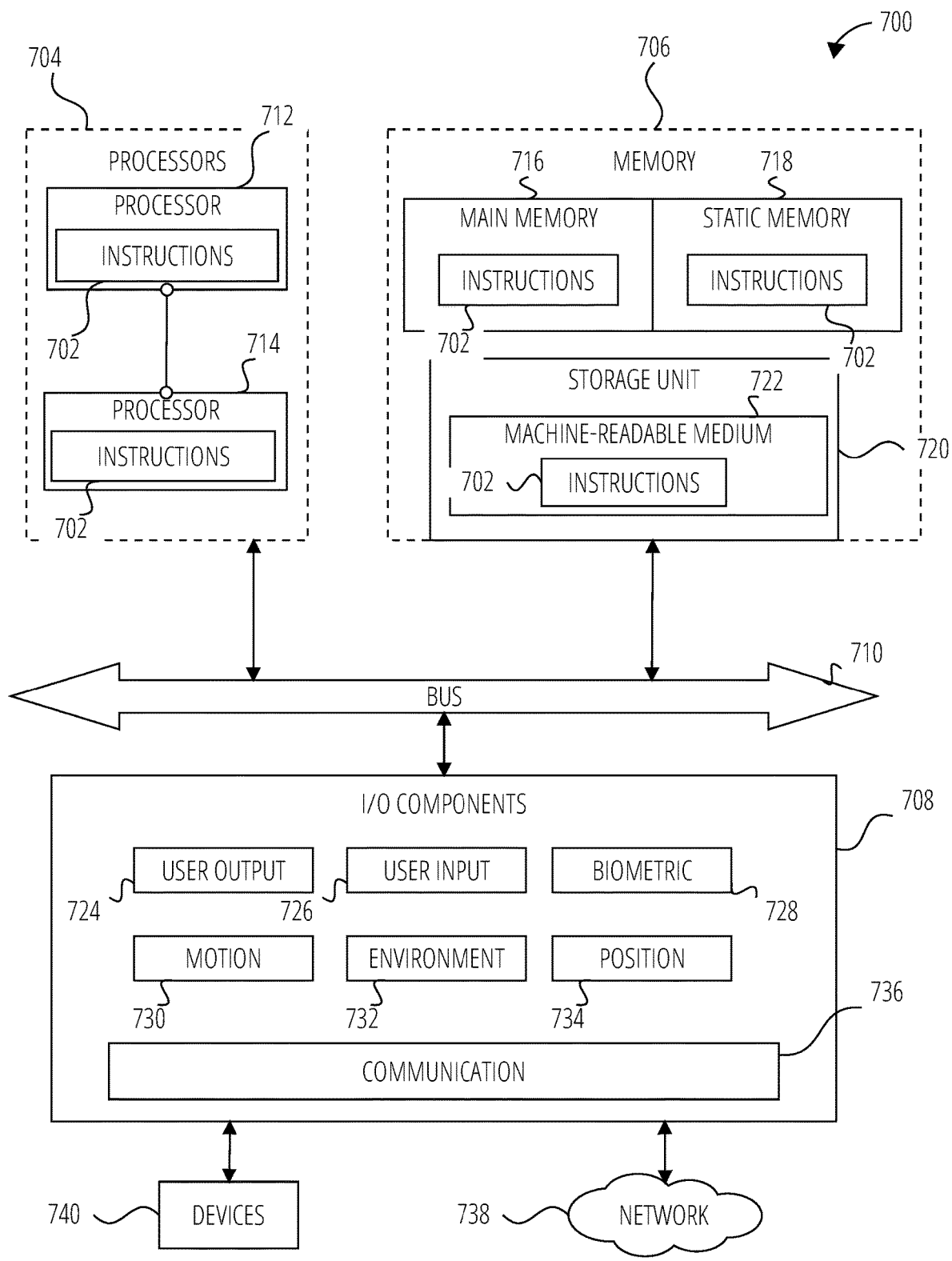
FIG. 7 is a diagrammatic representation of a machine in the form of a computer system within which a set of instructions may be executed to cause the machine to perform any one or more of the methodologies discussed herein, according to some examples.

FIG. 7 is a diagrammatic representation of the machine 700 within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more of the methods described herein. The instructions 702 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while a single machine 700 is illustrated, the term "machine" shall also be taken to include a collection of machines that individually or jointly execute the instructions 702 to perform any one or more of the methodologies discussed herein. The machine 700, for example, may comprise the user system 102 or any one of multiple server devices forming part of the interaction server system 110. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 708, which may be configured to communicate with each other via a bus 710. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that execute the instructions 702. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 716, a static memory 718, and a storage unit 720, both accessible to the processors 704 via the bus 710. The main memory 706, the static memory 718, and storage unit 720 store the instructions 702 embodying any one or more of the methodologies or functions described herein. The instructions 702 may also reside, completely or partially, within the main memory 716, within the static memory 718, within machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones may include a touch input device or other such input mechanisms, while a headless server machine will likely not include such a touch input device. It will be appreciated that the I/O components 708 may include many other components that are not shown in FIG. 7. In various examples, the I/O components 708 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 708 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 further include communication components 736 operable to couple the machine 700 to a network 738 or devices 740 via respective coupling or connections. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 716, static memory 718, and memory of the processors 704) and storage unit 720 may store one or more sets of instructions and data structures (e.g., software) embodying or used by any one or more of the methodologies or functions described herein. These instructions (e.g., the instructions 702), when executed by processors 704, cause various operations to implement the disclosed examples.

The instructions 702 may be transmitted or received over the network 738, using a transmission medium, via a network interface device (e.g., a network interface component included in the communication components 736) and using any one of several well-known transfer protocols (e.g., hypertext transfer protocol (HTTP)). Similarly, the instructions 702 may be transmitted or received using a transmission medium via a coupling (e.g., a peer-to-peer coupling) to the devices 740.

Software Architecture

Figure 8:
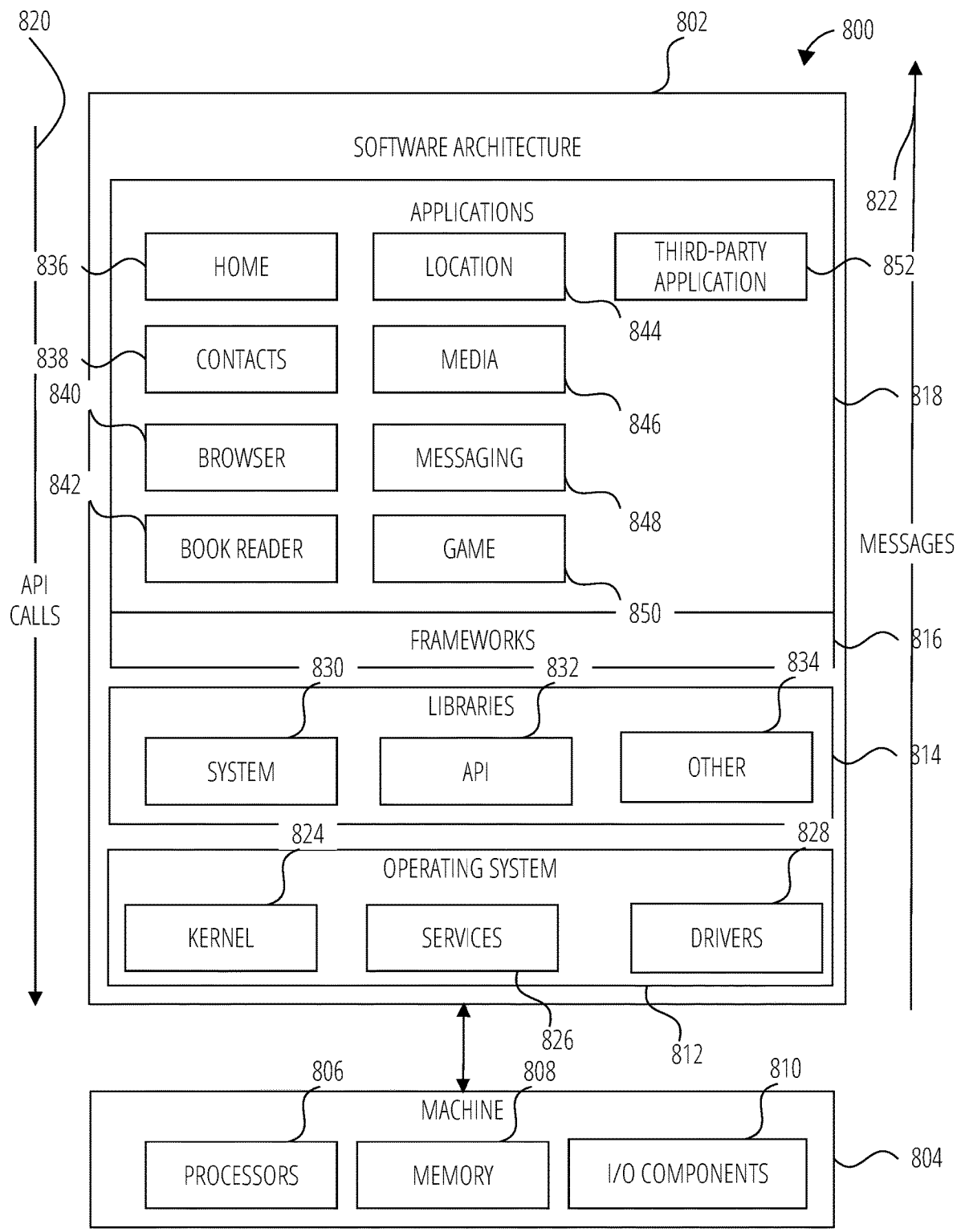
FIG. 8 is a block diagram showing a software architecture within which examples may be implemented.

FIG. 8 is a block diagram 800 illustrating a software architecture 802, which can be installed on any one or more of the devices described herein. The software architecture 802 is supported by hardware such as a machine 804 that includes processors 806, memory 808, and I/O components 810. In this example, the software architecture 802 can be conceptualized as a stack of layers, where each layer provides a particular functionality. The software architecture 802 includes layers such as an operating system 812, libraries 814, frameworks 816, and applications 818. Operationally, the applications 818 invoke API calls 820 through the software stack and receive messages 822 in response to the API calls 820.

The operating system 812 manages hardware resources and provides common services. The operating system 812 includes, for example, a kernel 824, services 826, and drivers 828. The kernel 824 acts as an abstraction layer between the hardware and the other software layers. For example, the kernel 824 provides memory management, processor management (e.g., scheduling), component management, networking, and security settings, among other functionalities. The services 826 can provide other common services for the other software layers. The drivers 828 are responsible for controlling or interfacing with the underlying hardware. For instance, the drivers 828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 814 provide a common low-level infrastructure used by the applications 818. The libraries 814 can include system libraries 830 (e.g., C standard library) that provide functions such as memory allocation functions, string manipulation functions, mathematic functions, and the like. In addition, the libraries 814 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 814 can also include a wide variety of other libraries 834 to provide many other APIs to the applications 818.

The frameworks 816 provide a common high-level infrastructure that is used by the applications 818. For example, the frameworks 816 provide various graphical user interface (GUI) functions, high-level resource management, and high-level location services. The frameworks 816 can provide a broad spectrum of other APIs that can be used by the applications 818, some of which may be specific to a particular operating system or platform.

In an example, the applications 818 may include a home application 836, a contacts application 838, a browser application 840, a book reader application 842, a location application 844, a media application 846, a messaging application 848, a game application 850, and a broad assortment of other applications such as a third-party application 852. The applications 818 are programs that execute functions defined in the programs. Various programming languages can be employed to create one or more of the applications 818, structured in a variety of manners, such as object-oriented programming languages (e.g., Objective-C, Java, or C++) or procedural programming languages (e.g., C or assembly language). In a specific example, the third-party application 852 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 852 can invoke the API calls 820 provided by the operating system 812 to facilitate functionalities described herein.

EXAMPLES

Example 1 is a method including accessing a chat session between a first user on a first computer device and a second user on a second computer device; accessing first user data, first activity data and first personalized media content associated with the first user, the first media personalized content comprising public media content that is related to the first user data and the first activity data; accessing second user data, second activity data and second personalized media content associated with the second user, the second personalized media content comprising public media content that is related to the second user data and the second activity data; generating a shared dataset, the shared dataset generated based on identifying common aspects between the first user data, the first activity data, the second user data and the second activity data; based on the shared dataset, generating shared content comprising public media content that is related to shared dataset; and causing display of a unified content feed comprising the shared content and the first personalized content to the first computer device and causing display of a unified content feed comprising the shared content and the second personalized content to the second computer device.

In Example 2, the subject matter of Example 1 including ranking display of the shared content higher than the first personalized content within the unified content feed on the first computer device.

In Example 3, the subject matter of any one of Examples 1-2 including wherein ranking display of the shared content higher than the first personalized content comprises: positioning display of public media content in the shared content more prominently in the unified content feed displayed on the first computer device.

In Example 4, the subject matter of any one of Examples 1-3 including wherein generating the shared content further comprises: accessing previously shared public media content within the chat session; and generating the shared content based on the shared dataset and the previously shared public media content.

In Example 5, the subject matter of any one of Examples 1-4 including receiving an indication from the first computing device of a recommended public media content from the first personalized content; and in response to receiving the indication, adding the recommended public media content for display as part of the shared content.

In Example 6, the subject matter of any one of Examples 1-5 including in response to receiving the indication, highly ranking the recommend public media content within the shared content.

In Example 7, the subject matter of any one of Examples 1-6 including wherein the first user data and the second user data comprise location data, demographic data, and social media network connection data.

In Example 8, the subject matter of any one of Examples 1-7 including wherein the first activity data comprises interaction data associated with the shared content and interaction data associated with the first personalized content.

In Example 9, the subject matter of any one of Examples 1-8 including wherein the interaction data associated with the shared content includes an amount of time spent viewing a public media content item in the shared content.

Example 10 is a computing system comprising means to implement of any of Examples 1-9.

In Example 11, the subject matter of Example 10, including wherein the system is a head-wearable apparatus or a client device.

In Example 12, the subject matter of any one of Example 10-11, including wherein the head-wearable apparatus is a pair of eyeglasses, having a frame that carries a pair of lenses and is coupled to the camera.

Example 13 is a non-transitory computer-readable storage medium storing instructions that, when executed by at least one processor, cause the at least one processor to perform the method of any of Examples 1-9.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
   at least one processor;
   at least one memory component storing instructions that, when executed by the at least one processor, cause the at least one processor to perform operations comprising:
   accessing a chat session between a first user on a first computer device and a second user on a second computer device;
   accessing first user data, first activity data and first personalized media content associated with a social media profile of the first user, the first media personalized content comprising public media content that is related to the first user data and the first activity data;
   accessing second user data, second activity data and second personalized media content associated with a social media profile of the second user, the second personalized media content comprising public media content that is related to the second user data and the second activity data;
   generating a shared dataset, the shared dataset generated based on identifying common aspects between the first user data, the first activity data, the second user data and the second activity data, the common aspects comprising an overlap in subscriptions to content creators between the first personalized media content and the second personalized media content and an overlap in media content categories between the first personalized media content and the second personalized media content;
   based on the shared dataset, generating shared content comprising public media content that is related to the shared dataset; and
   causing display of a unified content feed comprising the shared content and the first personalized content to the first computer device and causing display of a unified content feed comprising the shared content and the second personalized content to the second computer device.

2. The system of claim 1, further comprising:
   ranking display of the shared content higher than the first personalized content within the unified content feed on the first computer device.

3. The system of claim 2, wherein ranking display of the shared content higher than the first personalized content comprises:
   positioning display of public media content in the shared content more prominently in the unified content feed displayed on the first computer device.

4. The system of claim 1, wherein generating the shared content further comprises:
   accessing previously shared public media content within the chat session; and
   generating the shared content based on the shared dataset and the previously shared public media content.

5. The system of claim 1, further comprising:
   receiving an indication from the first computing device of a recommended public media content from the first personalized content; and
   in response to receiving the indication, adding the recommended public media content for display as part of the shared content.

6. The system of claim 5, in response to receiving the indication, highly ranking the recommend public media content within the shared content.

7. The system of claim 1, wherein the first user data and the second user data comprise location data, demographic data, and social media network connection data.

8. The system of claim 1, wherein the first activity data comprises interaction data associated with the shared content and interaction data associated with the first personalized content.

9. The system of claim 8, wherein the interaction data associated with the shared content includes an amount of time spent viewing a public media content item in the shared content.

10. A method comprising:
    accessing a chat session between a first user on a first computer device and a second user on a second computer device;
    accessing first user data, first activity data and first personalized media content associated with a social media profile of the first user, the first media personalized content comprising public media content that is related to the first user data and the first activity data;
    accessing second user data, second activity data and second personalized media content associated with a social media profile of the second user, the second personalized media content comprising public media content that is related to the second user data and the second activity data;
    generating a shared dataset, the shared dataset generated based on identifying common aspects between the first user data, the first activity data, the second user data and the second activity data, the common aspects comprising an overlap in subscriptions to content creators between the first personalized media content and the second personalized media content and an overlap in media content categories between the first personalized media content and the second personalized media content;
    based on the shared dataset, generating shared content comprising public media content that is related to the shared dataset; and
    causing display of a unified content feed comprising the shared content and the first personalized content to the first computer device and causing display of a unified content feed comprising the shared content and the second personalized content to the second computer device.

11. The method of claim 10 further comprising:
    ranking display of the shared content higher than the first personalized content within the unified content feed on the first computer device.

12. The method of claim 11, wherein ranking display of the shared content higher than the first personalized content comprises:
    positioning display of public media content in the shared content more prominently in the unified content feed displayed on the first computer device.

13. The method of claim 10, wherein generating the shared content further comprises:
    accessing previously shared public media content within the chat session; and
    generating the shared content based on the shared dataset and the previously shared public media content.

14. The method of claim 10, further comprising:
    receiving an indication from the first computing device of a recommended public media content from the first personalized content; and
    in response to receiving the indication, adding the recommended public media content for display as part of the shared content.

15. The method of claim 14, in response to receiving the indication, highly ranking the recommend public media content within the shared content.

16. The method of claim 10, wherein the first user data and the second user data comprise location data, demographic data, and social media network connection data.

17. The method of claim 10, wherein the second activity data comprises interaction data associated with the shared content and interaction data associated with the second personalized content.

18. The method of claim 17, wherein the interaction data associated with the shared content includes an amount of time spent viewing a public media content item in the shared content.

19. A non-transitory computer-readable storage medium storing instructions that, when executed by at least one processor, cause the at least one processor to perform operations comprising:
    accessing a chat session between a first user on a first computer device and a second user on a second computer device;
    accessing first user data, first activity data and first personalized media content associated with a social media profile of the first user, the first media personalized content comprising public media content that is related to the first user data and the first activity data;
    accessing second user data, second activity data and second personalized media content associated with a social media profile of the second user, the second personalized media content comprising public media content that is related to the second user data and the second activity data;
    generating a shared dataset, the shared dataset generated based on identifying common aspects between the first user data, the first activity data, the second user data and the second activity data, the common aspects comprising an overlap in subscriptions to content creators between the first personalized media content and the second personalized media content and an overlap in media content categories between the first personalized media content and the second personalized media content;
    based on the shared dataset, generating shared content comprising public media content that is related to the shared dataset; and
    causing display of a unified content feed comprising the shared content and the first personalized content to the first computer device and causing display of a unified content feed comprising the shared content and the second personalized content to the second computer device.

20. The non-transitory computer-readable storage medium of claim 19, further comprising:
    ranking display of the shared content higher than the second personalized content within the unified content feed on the second computer device.

* * * * *